(12) United States Patent
Yuan et al.

(10) Patent No.: US 12,534,996 B2
(45) Date of Patent: Jan. 27, 2026

(54) DETECTION OF FLAWS BASED ON PROCESSING OF NUCLEAR SIGNALS

(71) Applicant: Baker Hughes Oilfield Operations LLC, Houston, TX (US)

(72) Inventors: Peng Yuan, Spring, TX (US); Feyzi Inanc, Spring, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 111 days.

(21) Appl. No.: 18/364,778

(22) Filed: Aug. 3, 2023

(65) Prior Publication Data

US 2025/0043675 A1    Feb. 6, 2025

(51) Int. Cl.
*E21B 47/005*     (2012.01)
*G01V 5/12*       (2006.01)

(52) U.S. Cl.
CPC .............. *E21B 47/005* (2020.05); *G01V 5/12* (2013.01)

(58) Field of Classification Search
CPC ..................................................... E21B 47/005
See application file for complete search history.

(56) References Cited

U.S. PATENT DOCUMENTS

| | | | | |
|---|---|---|---|---|
| 5,001,342 A | * | 3/1991 | Rambow | ................ G01B 15/02 |
| | | | | 250/303 |
| 5,159,577 A | * | 10/1992 | Twist | ...................... E21B 47/00 |
| | | | | 73/152.01 |
| 6,044,326 A | * | 3/2000 | Huiszoon | .............. E21B 47/085 |
| | | | | 702/6 |
| 6,483,777 B1 | * | 11/2002 | Zeroug | ..................... G01V 1/44 |
| | | | | 367/35 |
| 2016/0202387 A1 | | 7/2016 | Fox et al. | |
| 2016/0327681 A1 | | 11/2016 | Lexa et al. | |
| 2017/0089846 A1 | * | 3/2017 | Guo | ......................... G01V 5/12 |
| 2017/0167253 A1 | * | 6/2017 | Lemarenko | .......... B06B 1/0651 |
| 2019/0049618 A1 | | 2/2019 | Kasten et al. | |
| 2019/0383130 A1 | * | 12/2019 | Fox | .......................... G01V 1/40 |
| 2020/0400015 A1 | | 12/2020 | Ge et al. | |
| 2021/0373194 A1 | * | 12/2021 | Mamtimin | ............... G01V 5/12 |
| 2023/0144478 A1 | | 5/2023 | Inanc et al. | |

OTHER PUBLICATIONS

International Search Report and Written Opinion for International Application No. PCT/US2024/040482, International Date of Filing Aug. 1, 2024, Date of Mailing Oct. 29, 2024, 8 pages.

* cited by examiner

*Primary Examiner* — Yanick A Akaragwe
(74) *Attorney, Agent, or Firm* — CANTOR COLBURN LLP (57) ABSTRACT

A system for inspecting a bond includes a sensor device configured to be deployed in a borehole proximate to a first tubular downhole component, the sensor device configured to direct measurement signals to a bonding layer and detect nuclear signals from the bonding layer during rotation of the sensor device, the bonding layer configured to secure the first tubular downhole component to a borehole wall or another tubular component. The system also includes a processor configured to process nuclear signal data to remove variations in the nuclear signal data due to rotation of the sensor device when the sensor device is de-centered relative to the first tubular downhole component, the processing resulting in a set of processed data, and analyze the processed data to detect one or more flaws in the bonding layer.

20 Claims, 8 Drawing Sheets

DETECTION OF FLAWS BASED ON PROCESSING OF NUCLEAR SIGNALS

BACKGROUND

Subterranean operations are performed in various fields, including fields related to energy production. For example, boreholes or wells are drilled as part of hydrocarbon exploration and production operations, and as part of other energy industry operations such as geothermal production. Various components and devices are often deployed into a borehole to facilitate such operations.

For example, oil and gas wells are typically constructed and maintained through the use of casings and tubulars. Boreholes are often supported by casing, which is secured to a borehole wall by a bonding material. In some instances, there may be multiple tubulars in concentric multilayered configurations with annular spaces in-between that may be filled by a bonding material. Typically, such bonding materials are oilfield cements. The integrity of bonds between a tubular and a borehole, as well as the integrity of bonds between tubulars, is important to guard against fluid leakage and otherwise ensure proper operation of a borehole system.

BRIEF SUMMARY

An embodiment of a system for inspecting a bond in a borehole system includes a sensor device configured to be deployed in a borehole proximate to a first tubular downhole component, the sensor device configured to direct measurement signals to a bonding layer formed by a bonding material and detect nuclear signals from the bonding layer during rotation of the sensor device through a plurality of azimuthal positions, the bonding layer configured to secure the first tubular downhole component to a borehole wall or another tubular component. The system also includes a processor configured to acquire nuclear signal data based on the detected nuclear signals, the processor configured to process the nuclear signal data to remove variations in the nuclear signal data due to rotation of the sensor device when the sensor device is de-centered relative to the first tubular downhole component, the processing resulting in a set of processed data, and analyze the processed data to detect one or more flaws in the bonding layer.

An embodiment of a method of inspecting a bond in a borehole system includes acquiring nuclear signal data from nuclear signals detected by a sensor device deployed in a borehole proximate to a first tubular downhole component, the downhole component secured to a borehole wall or another tubular component by a bonding layer formed by a bonding material, the nuclear signals detected by the sensor device when the sensor device is rotated through a plurality of azimuthal positions. The method also includes processing the nuclear signal data to remove variations in the nuclear signal data due to rotation of the sensor device when the sensor device is de-centered relative to the first tubular downhole component, the processing resulting in a set of processed data, and analyzing the processed data to detect one or more flaws in the bonding layer.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Systems, devices and methods for detecting flaws and inspecting downhole components are provided. An embodiment of a method includes performing a measurement process to inspect a bonding layer attached to the component (e.g., a casing or other tubular), such as a cement layer, and acquiring signal data. The measurement process, in an embodiment, is a nuclear measurement process that includes detecting nuclear signals due to nuclear interactions in a region being measured and/or nuclear interactions used to generate photons, particles and/or other emissions. In an embodiment, the measurement process includes deploying a rotatable sensor device, such as a gamma ray inspection device, and acquiring nuclear signals in the form of gamma rays as the sensor device rotates.

The method includes processing nuclear signal data to remove variations in the nuclear signals that result from rotation of the sensor device. In an embodiment, the variations result from changes in the transmission path of nuclear signals (e.g., gamma rays) when the sensor device is rotating and de-centered with respect to a borehole or tubular component (e.g., casing).

In an embodiment, the processing is based on comparing nuclear signal data (e.g., a measurement curve) to a set of reference data. The set of reference data may be acquired from measurements performed on a bonding layer having no significant flaws, and/or from simulation of measurements of a flaw-free bonding layer. In an embodiment, the reference data is in the form of a reference curve, such as a sinusoidal reference curve.

The method includes removing variations due to rotation by processing the nuclear signal data or measurement curve based on the reference data or reference curve. The processing may include normalization of the nuclear signal data based on amplitudes of the reference data, background removal using the reference data, or other technique that removes the influence of rotation from the nuclear signal data. The resulting processed data is used to detect flaws by identifying one or more peaks in the processed data. Information such as the azimuthal location of flaws and/or flaw size (e.g., angular or azimuthal extent), may also be derived from the processed data.

Embodiments described herein present a number of advantages. The embodiments provide an improvement to technologies related to flaw detection and inspection of bonding layers and bonding materials used to secure downhole components. For example, measurements taken by rotating inspection tools such as rotating gamma ray measurement devices can be affected by variations in distance and an amount of fluid in the path of nuclear signals. Such variations may occur when an inspection tool is de-centered within a tubular or borehole. As the amount of variation in nuclear signals due to the presence of flaws is much smaller than the variation due to rotation, detection of flaws from measurement data is difficult. Embodiments address this challenge by providing processing methods that more clearly differentiate and reveal variations due to flaws.

Figure 1:
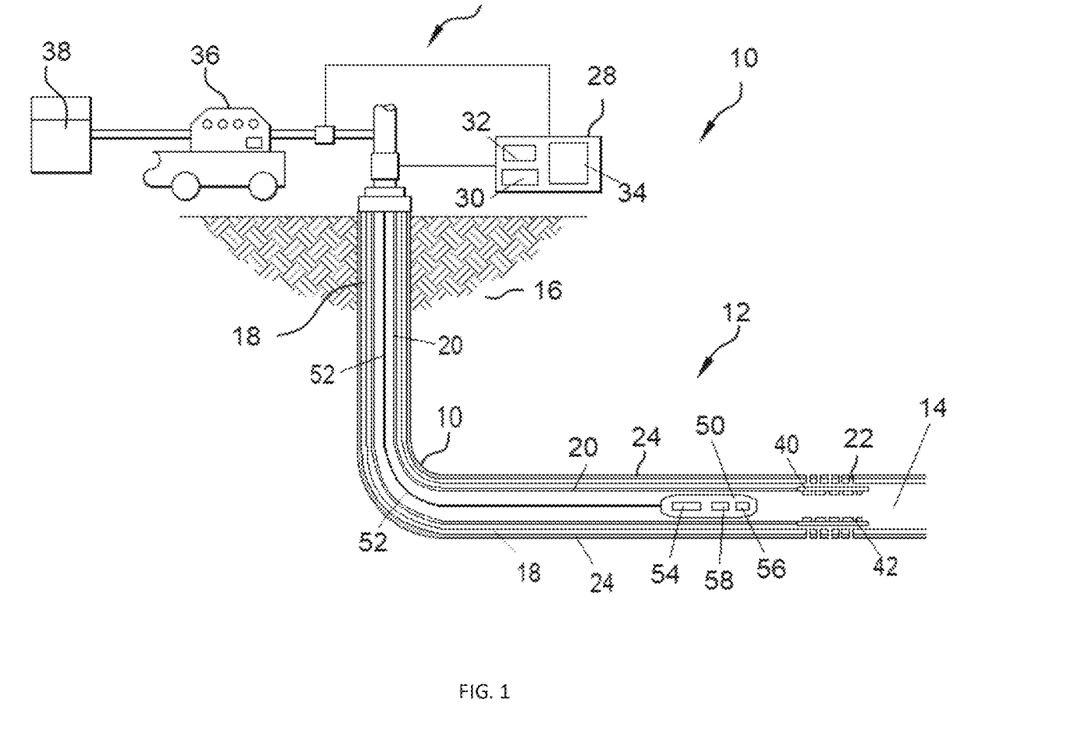
FIG. 1 depicts an embodiment of a system for performing subterranean operations.

FIG. 1 illustrates an embodiment of a system 10 for performing subterranean operations, such as production, stimulation, completion and/or measurement operations. The system 10 includes a borehole string 12 that is shown disposed in a well or borehole 14 that penetrates a subterranean region 16 (including, for example, at least one earth formation).

In an embodiment, the borehole string 12 is configured as a production string. However, the system 10 is not limited to the embodiments described herein, as the system 10 may be configured for various purposes, such as well drilling operations, completions, resource extraction and recovery, steam assisted gravity drainage (SAGD), $CO_2$ sequestration, geothermal energy production and other operations.

The borehole string 12 may include one or more tubular components. For example, the borehole string 12 includes a casing 18 extending along a length of a borehole 14. The casing 18 extends through a vertical section of the borehole 14 and a horizontal or deviated section of the borehole 14.

The casing 18 is secured to the borehole 14 by a bonding material such as cement 24, which is injected between the casing 18 and the borehole wall. It is noted that "cement" may refer to any bonding material, and is not limited to any particular material or combination of materials.

A tubular 20 is also disposed in the borehole 14, and extends at least through a cased section of the borehole (i.e., section of the borehole 14 including the casing 18). The tubular 20 may be a production tubular for facilitating production of hydrocarbons and/or thermal energy from the region 16 or formation(s) therein. It is noted that the tubular 20 is not so limited and may be configured for any desired operation or purpose.

The casing 18 and the tubular 20 may include features for facilitating operations, such as stimulation and production. For example, the borehole 14 includes a production zone defined at least in part by fluid ports 22 (e.g., perforations or holes) in the casing 18, and production components of the production tubular 20. Production components may include a screen or filter 40 (e.g., sand screen), inflow ports 42, inflow control devices (not shown), packers (not shown) and others. It is noted that the casing 18 and/or the tubular 20 may be configured to define any number of production zones at any desired location(s) along the borehole 14.

The system 10 also includes surface equipment 26 such as a drill rig, rotary table, top drive, blowout preventer and/or others to facilitate deploying the borehole string 12 and/or controlling downhole components. Other components include, for example, a control system 36 configured to control functions such as deploying components into the borehole 14 and/or retrieving components. The control system 36 may also be configured to inject fluid into the borehole 14 by controlling one or more pumps in fluid communication with a fluid tank 38 or other fluid source.

The system 10 includes or receives a sensor device, such as an inspection tool or assembly 50, that is configured to measure properties of various downhole components. The inspection tool 50 may be used to measure properties of various downhole components and features to determine whether any damage has occurred, determine whether the components are properly configured, and/or evaluate the integrity of bonding materials such as the cement 24. For example, the inspection tool 50 is configured to be deployed proximate to (i.e., close enough to perform a measurement) to the tubular 20 and evaluate the integrity of the cement 24.

In an embodiment, the inspection tool 50 is configured to be deployed into the borehole 14 via a running string 52, such as a wireline or cable, or coiled tubing. The inspection tool 50 is not so limited, and may be installed in another assembly, component or logging tool. In an embodiment, the inspection tool 50 is configured as a gamma inspection device that includes a gamma ray source 54 and a gamma ray detector 56. The inspection tool 50 may include a processing device 58 for performing functions such as processing detected signals, storing data and/or analyzing data. One or more of the functions may be performed by a surface processing device. For example, detected signals and/or processed data may be transmitting to the surface via a communication line in the running string 52.

In one embodiment, the system 10 includes a surface processing unit 28 including a processor 30, an input/output (I/O) interface 32 and memory 34. The surface processing unit may be configured to perform functions such as controlling downhole components (e.g., controlling deployment of the tool 50 and/or rotation of tool components), controlling fluid circulation and/or fluid injection, monitoring or inspecting components during deployment, transmitting and receiving data, processing measurement data and/or monitoring operations.

Embodiments described herein are applicable to measurement and/or inspection of a variety of materials and/or components. For example, the embodiments may be applied to a multi-layer structure. An example of a multi-layer structure is a multi-tubular nested structure, which includes a number of annular layers that are nested within each other. The annular layers may include one or more conductive layers formed by casings, liners or other tubulars, and may also include other material layers such as cement layers.

The inspection tool 50 may include additional sensors or measurement devices, or the inspection tool 50 may be disposed in or connected to other measurement tools. Examples of other measurement tools include natural gamma ray measurement tools, and other nuclear measurement tools such as pulsed neutron and nuclear magnetic resonance (NMR) devices. Other examples include temperature, pressure and directional sensors.

Figure 2:
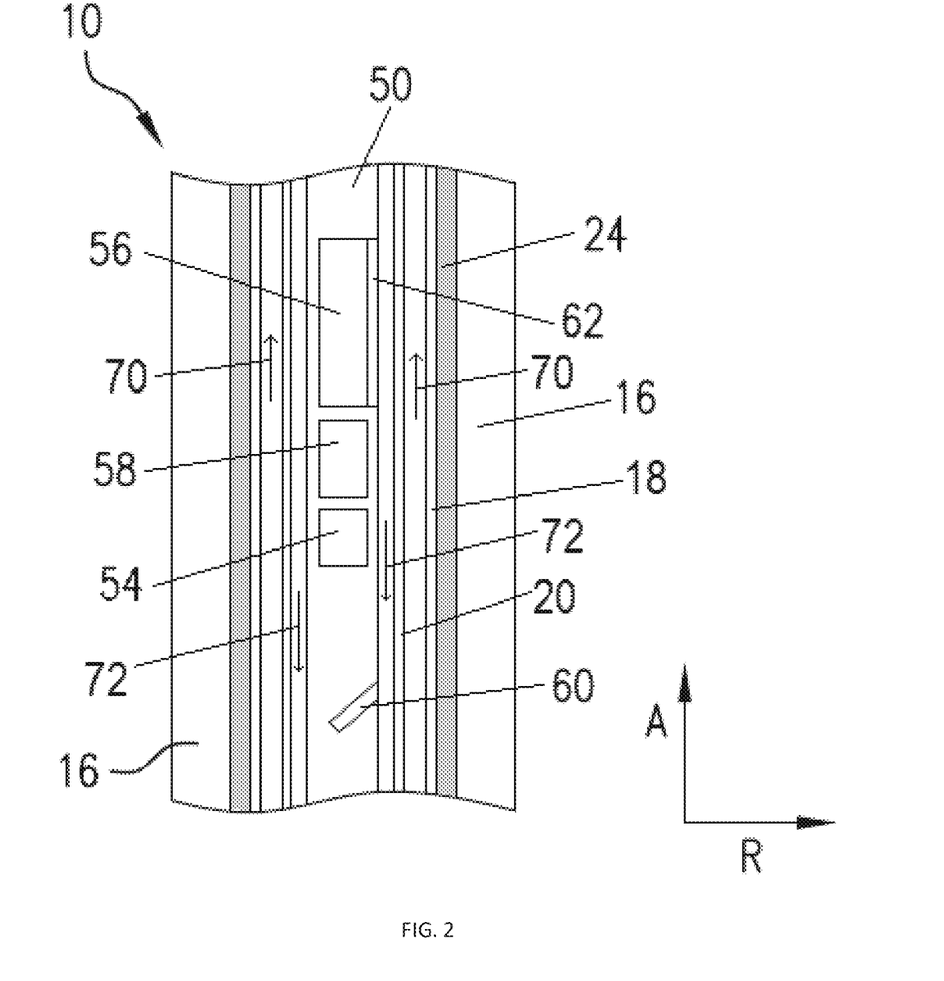
FIG. 2 depicts an example of a sensor device or measurement device configured to inspect downhole components and/or bonding layers.

FIG. 2 depicts an embodiment of the inspection tool 50, and an example of a multi-layer structure. The inspection tool 50 is configured as a gamma scanner for single or multi-annulus inspection including inspection of bonding materials (e.g., cement layers).

It is noted that embodiments described herein are not limited to a gamma ray inspection device. For example, embodiments may be used in conjunction with other types of sensors, such as acoustic sensors and other types of nuclear sensors, such as pulsed neutron and NMR sensors.

The inspection tool 50 includes the gamma ray source 54, such as a radioactive cesium source, and a collimation channel 60 for collimating gamma rays from the source 54 and directing the gamma rays radially toward the multi-layer structure. The source 54 and the detector 56 are arrayed along, for example, a longitudinal axis A.

The detector 56 is configured to detect scattered and/or induced gamma rays (return gamma rays) through a detector window or aperture 62 having a face that is orthogonal to a radial direction, shown as axis R. Outputs from the detector 56 may be provided to the processing device 58 and/or transmitted to the surface for processing and analysis.

In this example, the casing 18 is secured to a borehole wall by the cement layer 24, and the tubular 20 is deployed through the casing 18. The inspection tool 50 is deployed through the tubular 20, which may be a tool string including production components and/or any other desired components (e.g., a bottomhole assembly including a drilling assembly, measurement tools and/or other components). When deployed, borehole fluid circulates through the borehole 14, and as such, there is fluid 70 between the casing 18 and the tubular 20. There may also be fluid 72 in the tubular 20 and between the tool 50 and an inner surface of the tubular 20. As shown, when the tubular 20 is centered within the casing 20, the volume of borehole fluid 70, 72 between the tool 50 and the casing 18 is approximately the same.

In an embodiment, the inspection tool 50 is configured to detect flaws in bonding materials such as the cement layer 24. The inspection tool 50 may be used as part of an inspection process, such as a logging process to generate a cement bond log.

In use, the gamma source 54 sends gamma rays through the collimated channel 60, and the detector 56 receives return gamma rays through the aperture window 62. During the logging process, the inspection tool 50 is rotated such that the source collimation channel 60 and the detector aperture window 62 have synchronized rotation around a central axis of the tool 50. As a result, during rotation, a gamma beam from the source 54 scans azimuthally.

Because of this rotation, received gamma rays carry information about the azimuthal direction at which the detector aperture window 62 faces. The azimuthal direction may be expressed as a rotation angle θ (shown in FIGS. 3A and 3B). As the presence of a flaw affects the attenuation of gamma rays, the flaw causes a change in a detected nuclear signal as compared to a signal that would be detected if no flaw existed. As such, examining the received gamma rays or other nuclear signals as a function of rotation angle can reveal the presence and location of the flow. In an embodiment, the location of the flaw is expressed as an azimuthal location or angular the cement flaw can then be detected.

Generally, the sensor devices described herein are used to measure or inspect various components and/or materials. As discussed further below, methods described herein may be used for purposes such as inspecting downhole components (e.g., single and nested tubulars), including detection of flaws in bonding materials and/or bonding layers. A "flaw" refers to any condition of a bonding layer that could have an adverse impact on a downhole or subterranean operation. Examples of flaws include cavities or gaps in bonding material, flow channels, micro-annuli and others.

During rotation, the inspection tool 50 can become de-centered (i.e., the central longitudinal or rotational axis deviates from the center of a borehole or component), which can have an effect on detected nuclear signals. For example, de-centralization of the inspection tool relative to a component, such as the casing 18, causes a gamma ray count detected by the detector 56 to change during tool rotation due to differences in the distance and amount of fluid that gamma rays travel through to reach the detector 56. As a result, detection data (i.e., nuclear signal data and/or gamma ray count data) includes an oscillating sinusoidal background that can make flaw detection challenging.

Figure 3A:
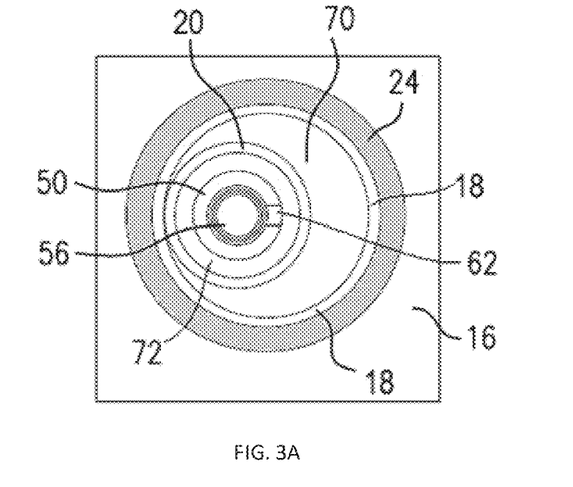
FIGS. 3A and 3B depict the sensor device of FIG. 2 when the sensor device is de-centered relative to a borehole or tubular.
Figure 3B:
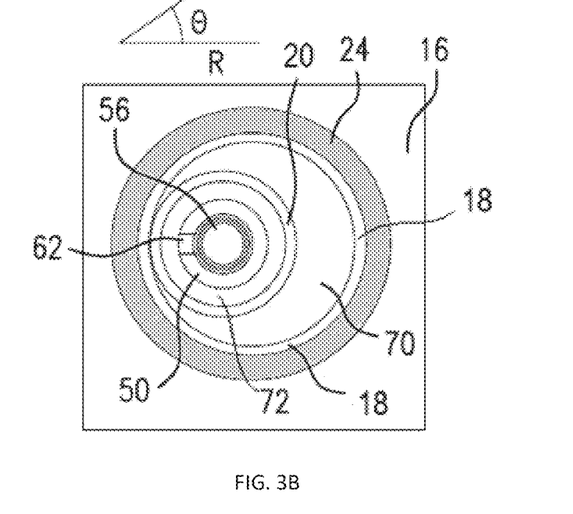

FIGS. 3A and 3B depict the inspection tool of FIG. 2 during an inspection or measurement operation. In this example, the inspection tool 50 is decentered. As shown in FIG. 3A, when the tool 50 is at a first angular position (the rotation angle θ is zero), the amount of borehole fluid 70, 72 in front of the detector aperture 62 is at a maximum value. After the tool 50 rotates 180° relative to the first angular position (FIG. 3B), the amount of borehole fluid 70, 72 in front of the detector aperture 62 is at a minimum value. The different amounts of fluid affect the gamma ray counts detected by the detector 56.

Figure 4:
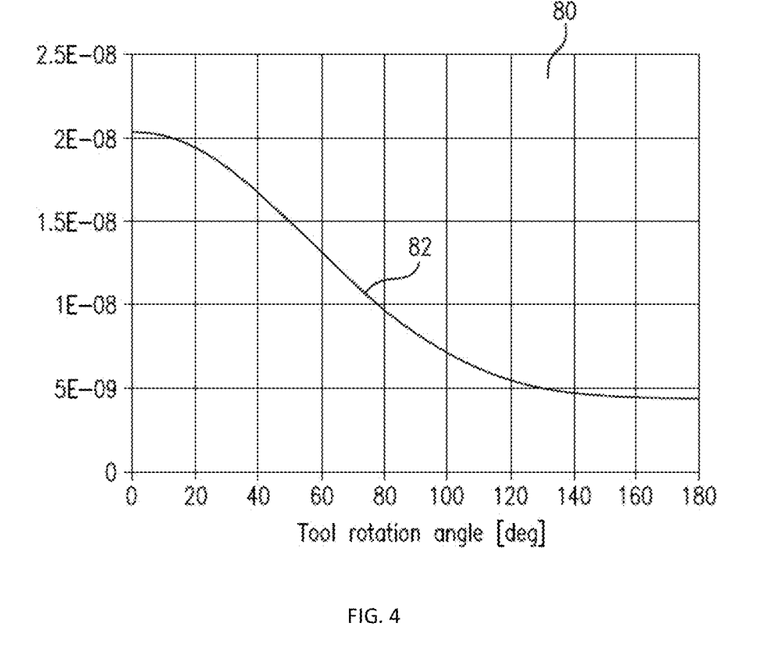
FIG. 4 depicts an example of a base curve used to process nuclear signal data according to one or more embodiments.

FIG. 4 includes a graph 80 that shows how eccentricity in the inspection tool 50 affects gamma ray detection. The graph 80 shows a probability of gamma rays received by the detector (e.g., probability of detected gamma ray counts being above some minimum value) as a function of angular position or rotation angle. As shown, the probability changes cyclically, resulting in a sinusoidal background or base curve 82.

The presence of flaws in a cement layer or other bonding material layer causes local disturbances or variations from the base curve 82. These local variations can be quite small as compared to the overall variation of the base curve, which can make it difficult to derive flaw information, such as location, flaw size and extent.

The system 10 is configured to perform a detection method that incorporates removal of background variation to facilitate detection of flaws in a cement bond or other bonding layer. A "cement bond" refers to any bonding material that secures a tubular to a borehole wall or other tubular. Removal of the background variation is based on comparing gamma ray detection data (or other nuclear signal data) to a base curve that is indicative of gamma ray detections from the tool 50 when there are no flaws.

Figure 5:
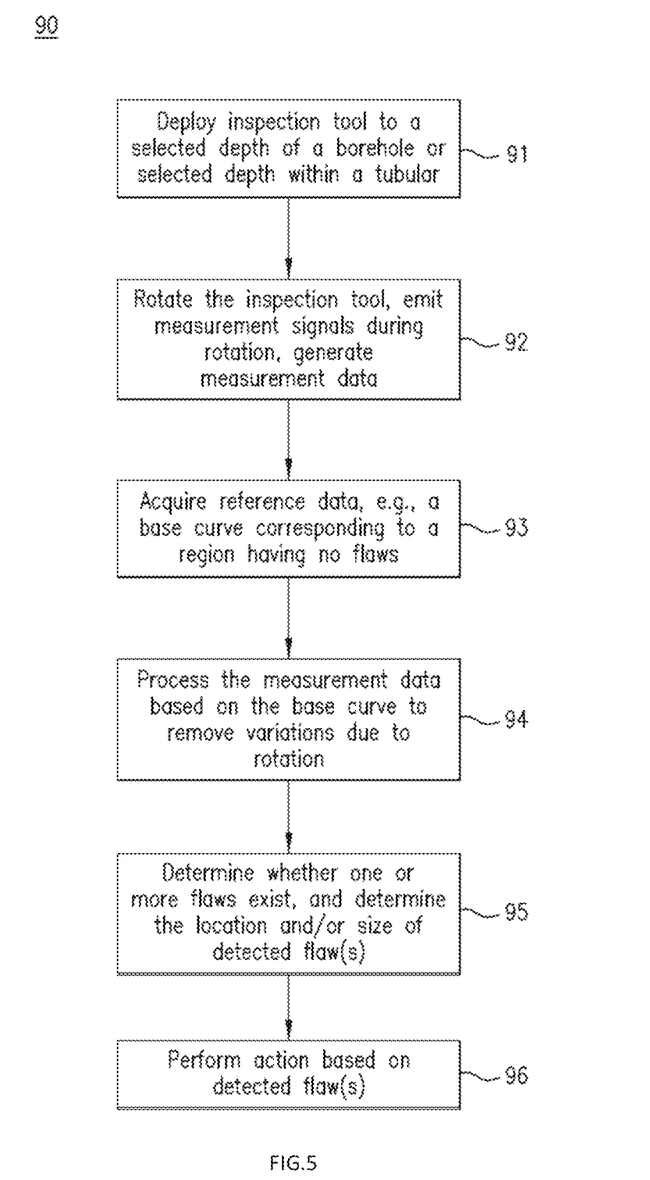
FIG. 5 is a flow diagram representing an embodiment of a method of inspecting components of a borehole system, including inspection of a bonding layer and/or detection of flaws in the bonding layer.

FIG. 5 illustrates a method 90 of inspecting a bond between a tubular and a borehole wall, or a bond between a tubular and another component. The method 90 includes steps or stages represented by blocks 91-96. In one embodiment, the method 90 includes the execution of all of the steps or stages in the order described. However, certain steps or stages may be omitted or added, or the order of the steps or stages may be changed.

The method 90 is discussed as being performed by a processing device (e.g., the surface processing unit 28 and/or the downhole processing device 58) in conjunction with the rotatable inspection tool 50. It is noted that the method 90 is not limited to use with the processing device or devices described herein, and may be performed using any suitable device or system having a processor.

In addition, the method 90 is not limited to the types of sensor devices discussed in examples herein, as the method 90 may be applicable to any sensor device that may experience de-centered rotation. Examples include various nuclear sensor devices, acoustic devices and other sensor devices for which signal detection is affected by de-centered rotation.

At block 91, a measurement operation is initiated by deploying the inspection tool 50 into the borehole 14 and advancing the inspection tool 50 to a selected depth along the borehole 14. For example, the inspection tool 50 is deployed to a desired depth within the tubular 20.

At block 92, the inspection tool 50 is rotated and signals such as gamma rays are generated and directed toward the tubular 20, the casing 18 and the cement layer 24. The inspection tool 50 may be advanced axially along the tubular 20 as the tool 50 rotates and emits the signals. The detector 56 receives return gamma rays and outputs nuclear signal data indicative of gamma ray counts.

The nuclear signal data may be initially processed to generate a measurement curve or other data set. For example, a measurement curve is generated that presents nuclear signal data values (e.g., gamma ray counts or probabilities of detecting gamma rays) as a function of rotation angle.

At block 93, a set of reference data is acquired that reflects variations in nuclear signals due to rotation (e.g., rotation when the inspection tool 50 is de-centered). The set of reference data may be a reference curve or curves, or other suitable representation. For example, a reference curve such as the base curve 82 is acquired for use by the processing device to normalize the nuclear signal data, or otherwise remove background data from the nuclear signal data. The base curve 82 or other reference data may be obtained either from simulation or from real logging data (i.e., previous measurements).

For example, a base curve is generated based on previous measurements of a reference component. For example, the inspection tool 50 performs measurements at a depth corresponding to a section of the tubular 20 where it is known that no flaws exist, or measurement data is acquired from previous measurements performed in previous operations and/or in other downhole systems (e.g., other production strings in other boreholes). In another example, the base curve is generated experimentally by performing measurements in a laboratory or other surface location.

In another example, a base curve is generated based on a simulation. For example, a Monte Carlo simulation is performed to generate the base curve, or other representation of gamma ray count probability as a function of rotation angle. Any suitable simulation techniques may be used, such as modelling, discrete event simulation, machine learning and others.

The base curve may be updated, or one or more new base curves may be generated or acquired, during the measurement operation. As the inspection tool 50 enters different sections of the borehole, a base curve may be customized or selected based on characteristics of the system, parameters of the measurement operation and/or properties of a formation. For example, when logging at a different zone (such as different lithology zone), with changed background counts, a new base curve can either be recorded (via logging) or calculated (via simulation).

At block 94, the measurement curve is compared to the reference curve, or otherwise processed in view of the reference curve, to remove variations due to rotation. This comparison results in a processed measurement curve that more clearly shows the presence of faults, e.g., includes one or more peaks that correspond to each detected flaw.

In an embodiment, the measurement curve is normalized using the reference curve. For example, a processed measurement curve is generated that includes a value (e.g., gamma ray count or probability) at each rotation angle, where the value is expressed in terms of a ratio of a measurement value (e.g., measured count) to a reference value of the reference curve. Normalization may be based on a ratio, a difference, or other relationship between measurement values and corresponding reference values. In another example, background variation removal is performed using the reference curve as background or noise data.

In an embodiment, the measurement curve is normalized using the base curve as follows:

$$N = \text{Counts}/\text{Counts}_{base},$$

where N is a normalized measurement curve; Counts refers to the measured counts at a given rotation angle; and $\text{Counts}_{base}$ refers to measured counts for the base curve at the given rotation angle.

At block 95, the processing device determines whether any flaws exist based on the processed measurement curve. If a flaw is detected, the azimuthal location of the flaw is determined by correlating the axial location to rotation angle. For example, the processing device detects a flaw if a peak is detected that has an amplitude greater than a selected threshold. The rotation angle of the peak may be used to determine the azimuthal location.

In addition to the azimuthal location of a flaw, the size of a flaw may be determined based on the processed measurement curve. A "size" may refer to thickness and/or length of a flaw. In an embodiment, the size corresponds to an azimuthal extent of the flaw, i.e., a length along an angular direction. For example, an amplitude of a peak that corresponds to a detected flaw is used to determine the size.

At block 96, various actions may be performed based on flaw information. For example, if a sufficient flaw is detected, flaw information may be stored locally or transmitted to the surface for further analysis. An alert or notification may be generated and transmitted to a user or other processing system.

Actions may also include designing subterranean operations or updating such operations based on flaw information. For example, operational parameters such as flow rate, placement of production zones, drilling parameters and others may be determined or adjusted based on flaw information.

Figure 6:
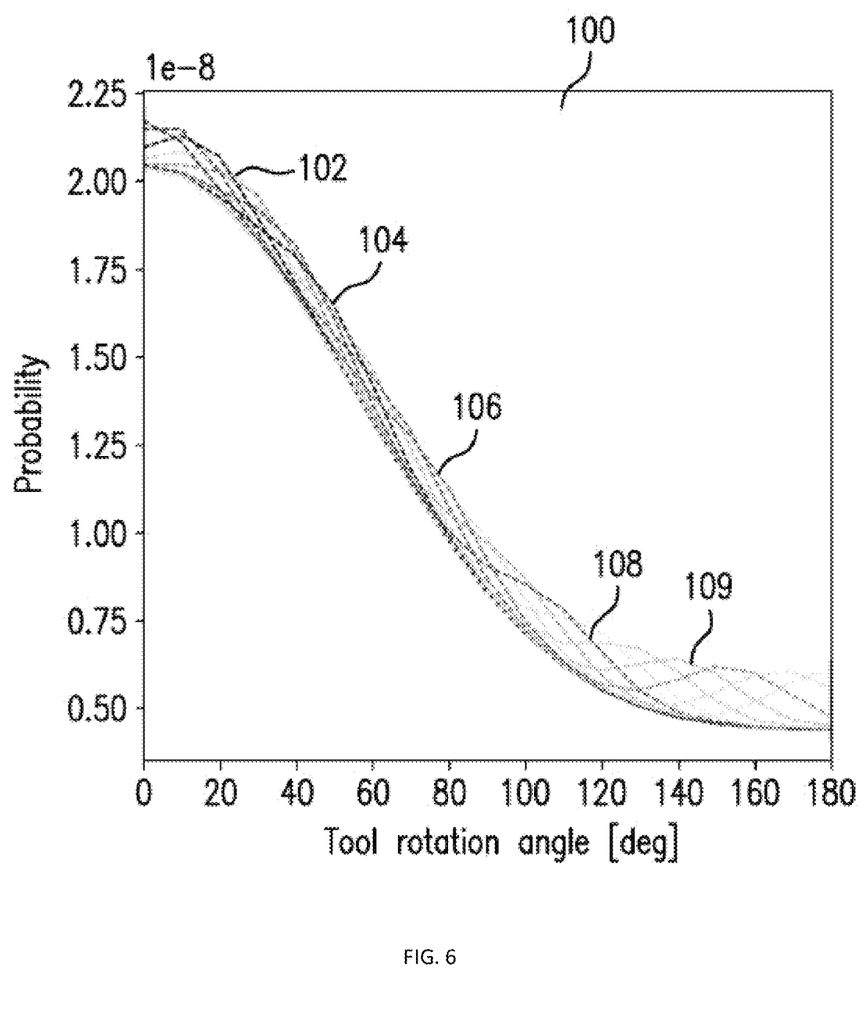
FIG. 6 depicts examples of nuclear signal data acquired based on measurements taken by a rotating sensor device or inspection tool.

FIG. 6 depicts an example of measurement curves acquired during rotation of the inspection tool 50, prior to processing as discussed herein. Each measurement curve was generated by performing measurements of a tubular region associated with a flaw at a different azimuthal location. The measurement data is represented by a graph 100 showing a probability of detecting gamma rays as a function of azimuthal or angular position. The probability may refer to a probability of detecting a threshold number of gamma ray counts.

A curve 102 shows the probability for a measurement taken at a given depth over a 180 degree rotation. At this depth, a flaw is located at about 30 degrees. A curve 104 is a measurement curve at a depth where a flaw exists at about 60 degrees, and a curve 106 is a measurement curve at a depth where a flaw exists at about 90 degrees. A curve 108 is a measurement curve at a depth where a flaw exists at about 120 degrees, and a curve 109 is a measurement curve at a depth where a flaw exists at about 150 degrees. As can be seen, variations due to flaws are much smaller than the variations due to rotation.

Figure 7:
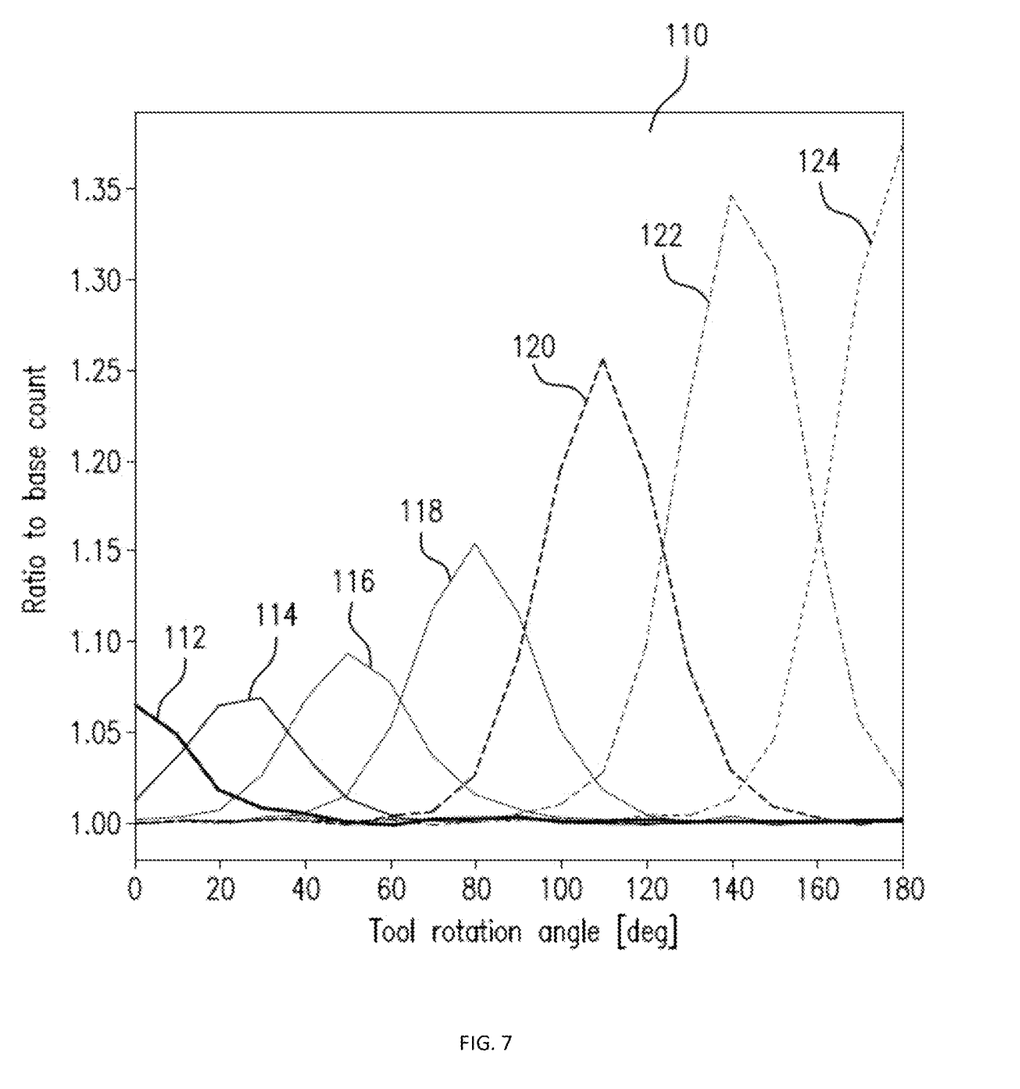
FIG. 7 depicts examples of nuclear signal data after processing via the method of FIG. 5.

FIG. 7 shows an example of measurement data or nuclear signal data after the data was processed using a base curve as discussed herein. In this example, the measurement curves of FIG. 6 were normalized according to the base curve 82 to remove variations due to rotation and generate processed measurement curves.

The processed measurement curves are presented in a graph 110 of a ratio of measured count to base count. The base count at each angular location is derived from a simulated or measured base curve, such as the curve 82 of FIG. 4. A curve 112 represents processed data where a flaw exists at about zero degrees, a curve 114 represents processed data where a flaw exists at about 30 degrees, and a curve 116 represents processed data where a flaw exists at about 60 degrees. A curve 118 represents processed data where a flaw exists at about 90 degrees, and a curve 120 represents processed data where a flaw exists at about 120 degrees. Curves 122 and 124 represent processed data where a flaw exists at about 150 degrees and 180 degrees, respectively.

As can be seen from FIG. 7, by using the methods described herein, the background influence can be successfully removed. As a result, the impact from cement can be clearly seen, as local variations in the measurement curves of FIG. 6 become global peaks of each curve. In addition, the locations (azimuthal positions or rotation angles) of the peaks can be correlated with azimuthal locations of flaws. For example, each peak location may correspond directly with azimuthal location, or each peak location can be calibrated to azimuthal location.

Figure 8:
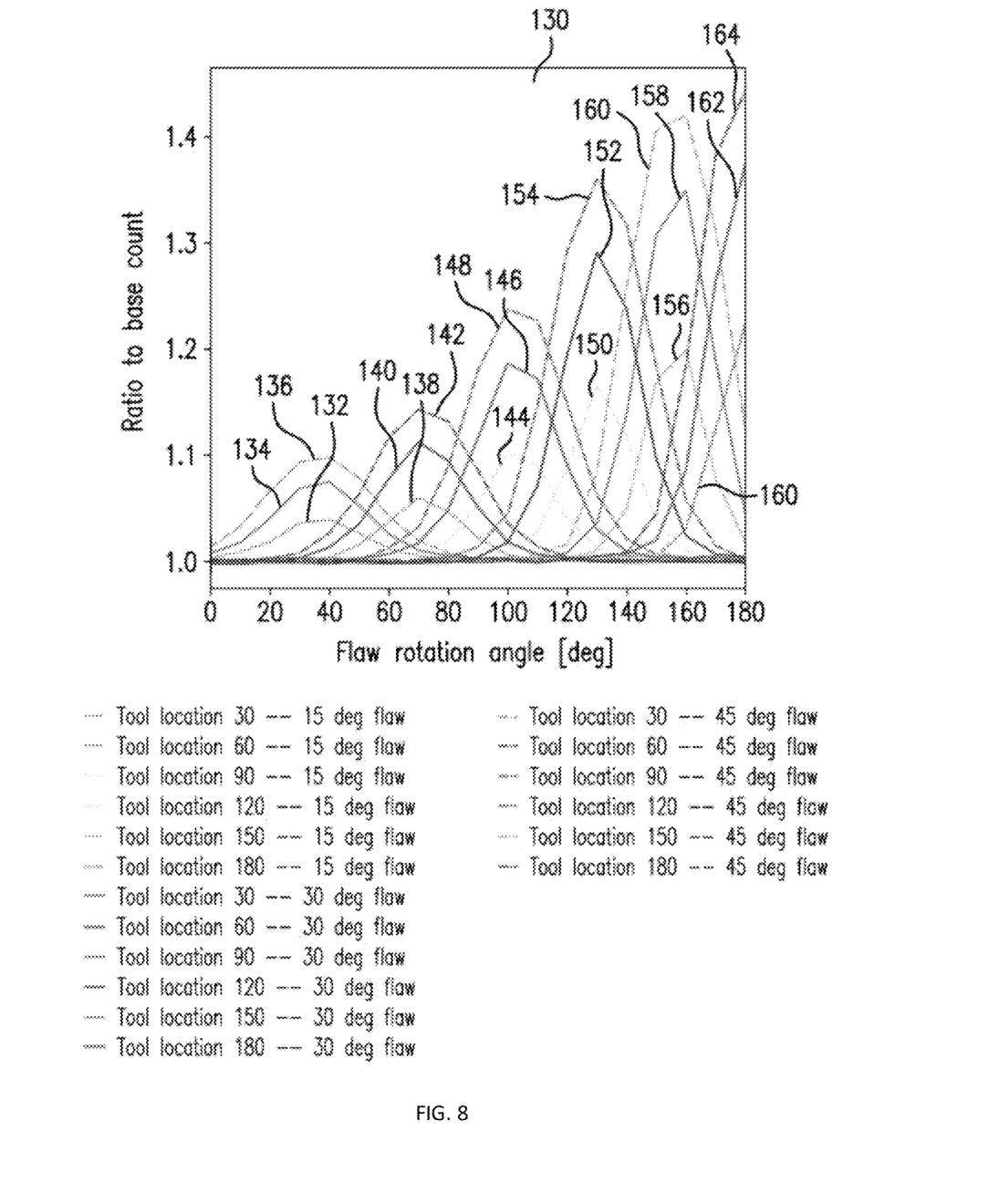
FIG. 8 depicts examples of nuclear signal data after processing via the method of FIG. 5.

FIG. 8 shows examples of processed measurement data for various flaw sizes and locations, and demonstrates the dependency of peak size on flaw size. In these example, the processed measurement data is expressed in a graph 130 as a function of a ratio of measured count to base count.

Curves 132, 134 and 136 correspond to processed measurement curves for a flaw located at 30 degrees. Curve 132 corresponds to a flaw size of 15 degrees, curve 134 corresponds to a flaw size of 30 degrees, and curve 136 corresponds to a flaw size of 45 degrees. Curves 138, 140 and 142 show curves for a flaw located at 60 degrees. Curve 138 corresponds to a flaw size of 15 degrees, curve 140 corresponds to a flaw size of 30 degrees, and curve 142 corresponds to a flaw size of 45 degrees.

Curves 144, 146 and 148 show curves for a flaw located at 90 degrees, in which the flaw has a size of 15 degrees, 30 degrees and 45 degrees, respectively. Curves 150, 152 and 154 show curves for a flaw located at 120 degrees, and having a size of 15 degrees, 30 degrees and 45 degrees, respectively. Curves 156, 158 and 169 show curves for a flaw located at 150 degrees, and having a flaw size of 15 degrees, 30 degrees and 45 degrees, respectively. Curves 160, 162 and 164 show curves for a flaw located at 180 degrees, having a flaw size of 15 degrees, 30 degrees and 45 degrees, respectively.

As shown, for a flaw at some rotation angle, a higher peak corresponds with a larger flaw size. Thus, the flaw size can be estimated by peak value (amplitude or value at the peak). Flaw size may be estimated, for example, by comparing peak sizes to reference data (calibrated peak sizes) derived from simulations, experiment and/or previous measurements (e.g., measurements performed during a previous operation, or measurements performed at a previous production zone or other location in the same borehole string).

The above examples illustrates the ability of the systems described herein to accurately locate flaws from nuclear signal data. The embodiments thus provide an improvement over existing techniques.

Set forth below are some embodiments of the foregoing disclosure:

Embodiment 1: A system for inspecting a bond in a borehole system, the system comprising: a sensor device configured to be deployed in a borehole proximate to a first tubular downhole component, the sensor device configured to direct measurement signals to a bonding layer formed by a bonding material and detect nuclear signals from the bonding layer during rotation of the sensor device through a plurality of azimuthal positions, the bonding layer configured to secure the first tubular downhole component to a borehole wall or another tubular component; a processor configured to acquire nuclear signal data based on the detected nuclear signals, the processor configured to: process the nuclear signal data to remove variations in the nuclear signal data due to rotation of the sensor device when the sensor device is de-centered relative to the first tubular downhole component, the processing resulting in a set of processed data; and analyze the processed data to detect one or more flaws in the bonding layer.

Embodiment 2: The system of any prior embodiment, wherein the nuclear signals are gamma ray signals, and the sensor device includes a gamma ray source configured to emit gamma rays toward the bonding layer, and a detector configured to detect return gamma rays.

Embodiment 3: The system of any prior embodiment, wherein the first tubular component is part of a multi-tubular environment, the sensor device is configured to be disposed in a second tubular component, the second tubular component disposed within the first tubular component, the nuclear signals including signals that travel through the first tubular component and the second tubular component.

Embodiment 4: The system of any prior embodiment, wherein the processor is configured to process the nuclear signal data based on a reference curve indicative of nuclear signal values for a region of the borehole having no flaws in the bonding layer.

Embodiment 5: The system of any prior embodiment, wherein the reference curve is acquired based on at least one of: previous measurements and a simulation.

Embodiment 6: The system of any prior embodiment, wherein the processor is configured to process the nuclear signal data by normalizing the nuclear signal data based on the reference curve.

Embodiment 7: The system of any prior embodiment, wherein the processor is configured to process the nuclear signal data by performing background removal based on the reference curve.

Embodiment 8: The system of any prior embodiment, wherein the processor is configured to detect the flaw based on a peak in the processed data.

Embodiment 9: The system of any prior embodiment, wherein the processor is configured to estimate a location of the flaw based on a position of the peak in the processed data.

Embodiment 10: The system of any prior embodiment, wherein the processor is configured to estimate a size of the flaw based on an amplitude of the peak in the processed data.

Embodiment 11: A method of inspecting a bond in a borehole system, the method comprising: acquiring nuclear signal data from nuclear signals detected by a sensor device deployed in a borehole proximate to a first tubular downhole component, the downhole component secured to a borehole wall or another tubular component by a bonding layer formed by a bonding material, the nuclear signals detected by the sensor device when the sensor device is rotated through a plurality of azimuthal positions; processing the nuclear signal data to remove variations in the nuclear signal data due to rotation of the sensor device when the sensor device is de-centered relative to the first tubular downhole component, the processing resulting in a set of processed data; and analyzing the processed data to detect one or more flaws in the bonding layer.

Embodiment 12: The method of any prior embodiment, wherein the nuclear signals are gamma ray signals, and the sensor device includes a gamma ray source configured to emit gamma rays toward the bonding layer, and a detector configured to detect return gamma rays.

Embodiment 13: The method of any prior embodiment, wherein the first tubular component is part of a multi-tubular environment, the sensor device is configured to be disposed in a second tubular component, the second tubular component disposed within the first tubular component, the nuclear signals including signals that travel through the first tubular component and the second tubular component.

Embodiment 14: The method of any prior embodiment, wherein the processing the nuclear signal data is based on a reference curve indicative of nuclear signal values for a region of the borehole having no flaws in the bonding layer.

Embodiment 15: The method of any prior embodiment, wherein the reference curve is acquired based on at least one of: previous measurements and a simulation.

Embodiment 16: The method of any prior embodiment, wherein processing the nuclear signal data includes normalizing the nuclear signal data based on the reference curve.

Embodiment 17: The method of any prior embodiment, wherein processing the nuclear signal data includes performing background removal based on the reference curve.

Embodiment 18: The method of any prior embodiment, wherein analyzing the processed data includes detecting the flaw based on a peak in the processed data.

Embodiment 19: The method of any prior embodiment, wherein detecting the flaw includes estimating a location of the flaw based on a position of the peak in the processed data.

Embodiment 20: The method of any prior embodiment, wherein detecting the flaw includes estimating a size of the flaw based on an amplitude of the peak in the processed data.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" includes a range of ±8% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A system for inspecting a bond in a borehole system, the system comprising:

a sensor device configured to be deployed in a borehole proximate to a first tubular downhole component, the sensor device configured to direct measurement signals to a bonding layer formed by a bonding material and detect nuclear signals from the bonding layer during rotation of the sensor device through a plurality of azimuthal positions, the bonding layer configured to secure the first tubular downhole component to a borehole wall or another tubular component;

a processor configured to acquire nuclear signal data based on the detected nuclear signals, the processor configured to:

process the nuclear signal data to remove variations in the nuclear signal data due to rotation of the sensor device when the sensor device is de-centered relative to the first tubular downhole component, the processing resulting in a set of processed data, wherein the processing includes performing background removal based on a reference curve indicative of nuclear signal values for a region of the borehole having no flaws in the bonding layer, the reference curve representing variations in the nuclear signal values due to the rotation of the sensor device; and analyze the processed data to detect one or more flaws in the bonding layer.

2. The system of claim 1, wherein the reference curve is an oscillating sinusoidal curve.

3. The system of claim 1, wherein the first tubular component is part of a multi-tubular environment, the sensor device is configured to be disposed in a second tubular component, the second tubular component disposed within the first tubular component, the nuclear signals including signals that travel through the first tubular component and the second tubular component.

4. The system of claim 1, wherein the background removal results in a variation in the nuclear signal data becoming a global peak in a measurement curve.

5. The system of claim 4, wherein processed data is analyzed by correlating the global peak with a location of a flaw in the bonding layer.

6. The system of claim 1, wherein the reference curve is acquired based on at least one of: previous measurements and a simulation.

7. The system of claim 1, wherein the processor is configured to process the nuclear signal data by normalizing the nuclear signal data based on the reference curve, the normalizing based on a ratio of a measurement value of the nuclear signal data to a corresponding reference value of the reference curve, or a difference between the measurement value and the corresponding reference value.

8. The system of claim 1, wherein the processor is configured to detect the flaw based on a peak in the processed data.

9. The system of claim 8, wherein the processor is configured to estimate a location of the flaw based on a position of the peak in the processed data.

10. The system of claim 8, wherein the processor is configured to estimate a size of the flaw based on an amplitude of the peak in the processed data.

11. A method of inspecting a bond in a borehole system, the method comprising:
acquiring nuclear signal data from nuclear signals detected by a sensor device deployed in a borehole proximate to a first tubular downhole component, the first tubular downhole component secured to a borehole wall or another tubular component by a bonding layer formed by a bonding material, the nuclear signals detected by the sensor device when the sensor device is rotated through a plurality of azimuthal positions;
processing the nuclear signal data to remove variations in the nuclear signal data due to rotation of the sensor device when the sensor device is de-centered relative to the first tubular downhole component, the processing resulting in a set of processed data, wherein the processing includes performing background removal based on a reference curve indicative of nuclear signal values for a region of the borehole having no flaws in the bonding layer, the reference curve representing variations in the nuclear signal values due to the rotation of the sensor device; and
analyzing the processed data to detect one or more flaws in the bonding layer.

12. The method of claim 11, wherein the reference curve is an oscillating sinusoidal curve.

13. The method of claim 11, wherein the first tubular component is part of a multi-tubular environment, the sensor device is configured to be disposed in a second tubular component, the second tubular component disposed within the first tubular component, the nuclear signals including signals that travel through the first tubular component and the second tubular component.

14. The method of claim 11, wherein background removal results in a variation in the nuclear signal data becoming a global peak in a measurement curve.

15. The method of claim 14, wherein analyzing the processed data includes correlating the global peak with a location of a flaw in the bonding layer.

16. The method of claim 11, wherein the reference curve is acquired based on at least one of: previous measurements and a simulation.

17. The method of claim 11, wherein processing the nuclear signal data includes normalizing the nuclear signal data based on the reference curve, the normalizing based on a ratio of a measurement value of the nuclear signal data to a corresponding reference value of the reference curve, or a difference between the measurement value and the corresponding reference value.

18. The method of claim 11, wherein analyzing the processed data includes detecting the flaw based on a peak in the processed data.

19. The method of claim 18, wherein detecting the flaw includes estimating a location of the flaw based on a position of the peak in the processed data.

20. The method of claim 18, wherein detecting the flaw includes estimating a size of the flaw based on an amplitude of the peak in the processed data.

* * * * *